A. A. GRINER.
MACHINE FOR MAKING FABRICATED WIRE.
APPLICATION FILED JULY 17, 1919.

1,327,467.

Patented Jan. 6, 1920.
5 SHEETS—SHEET 1.

Inventor:
Alvah A. Griner,
By
Chas. E. Riorden
Att'y.

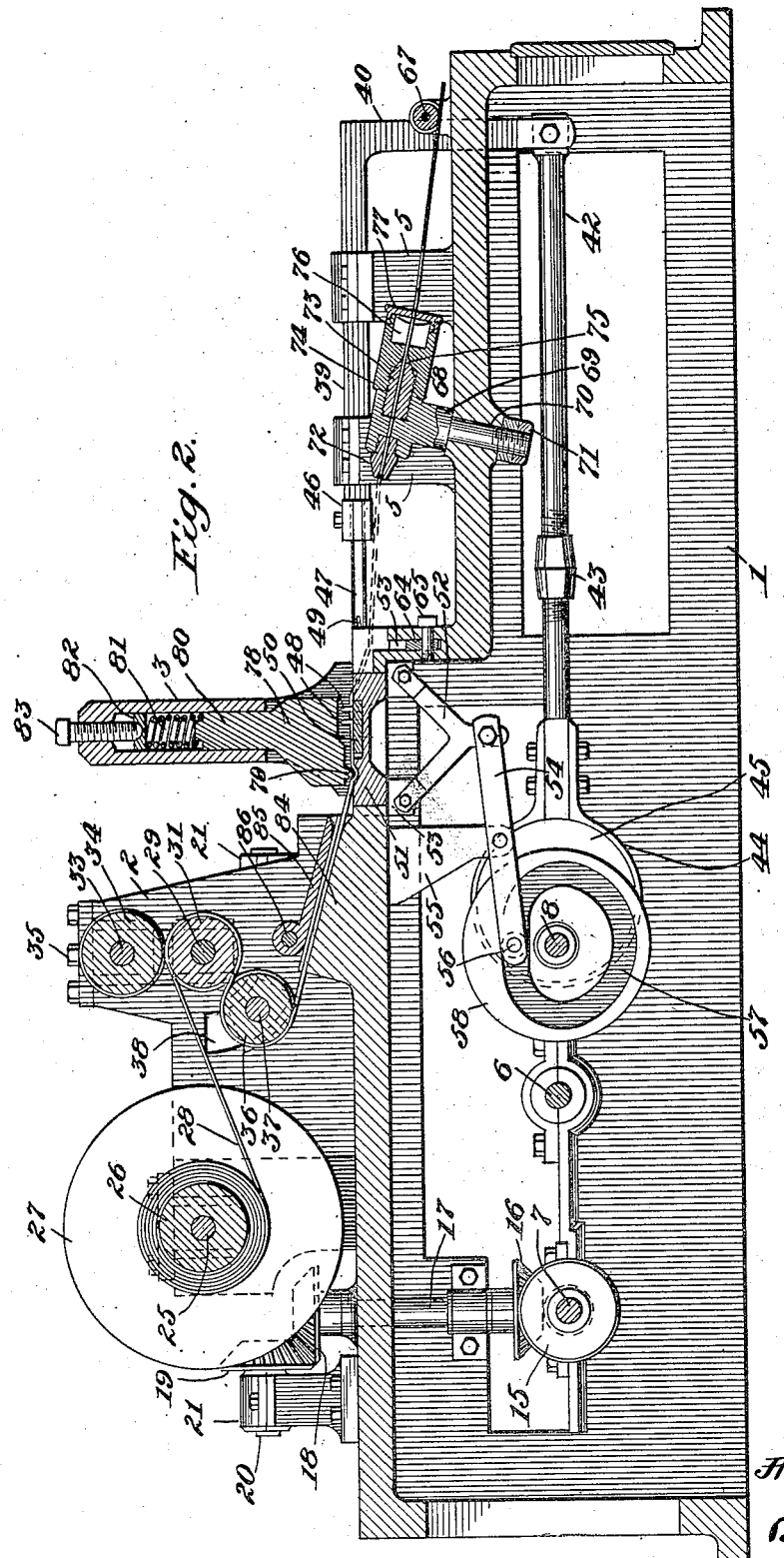

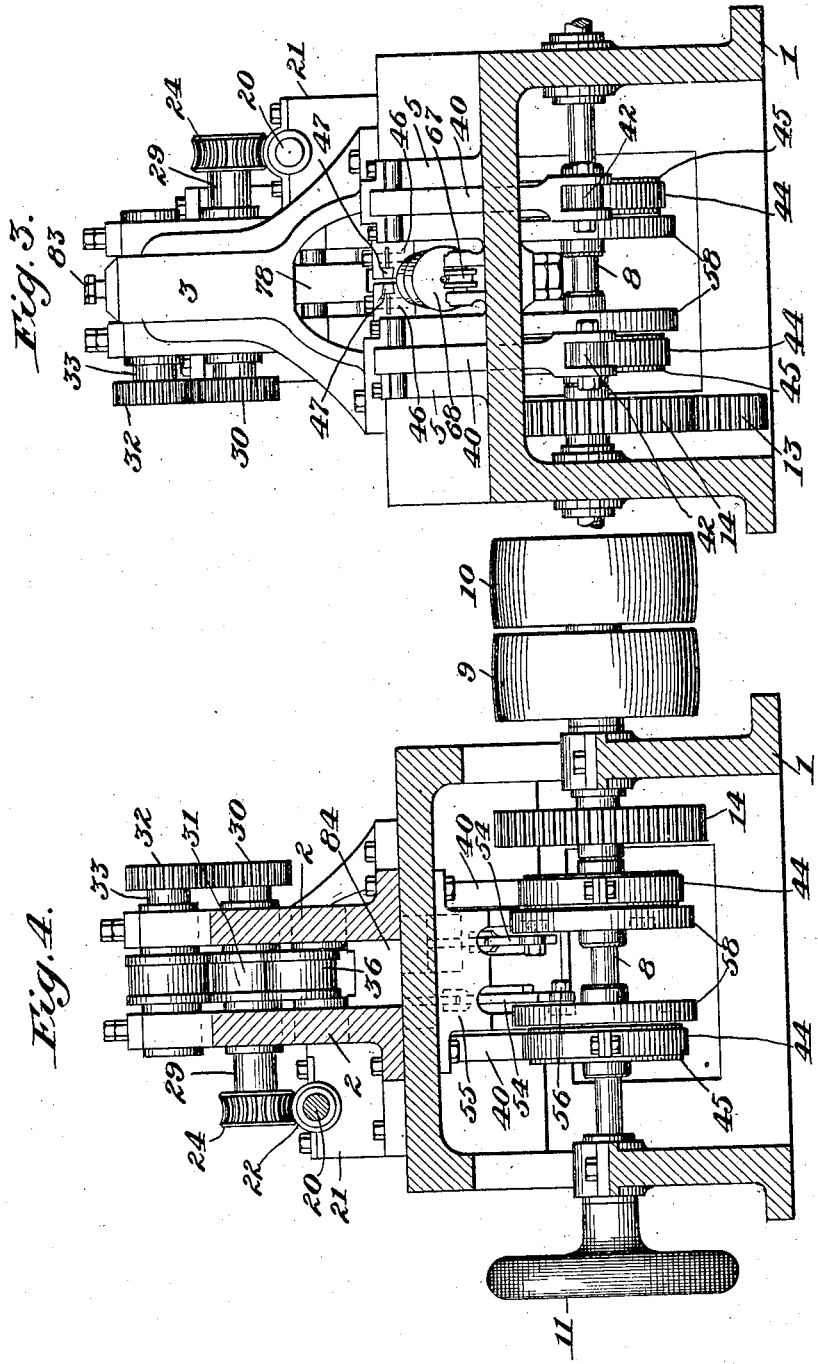

A. A. GRINER.
MACHINE FOR MAKING FABRICATED WIRE.
APPLICATION FILED JULY 17, 1919.
1,327,467.
Patented Jan. 6, 1920.
5 SHEETS—SHEET 4.
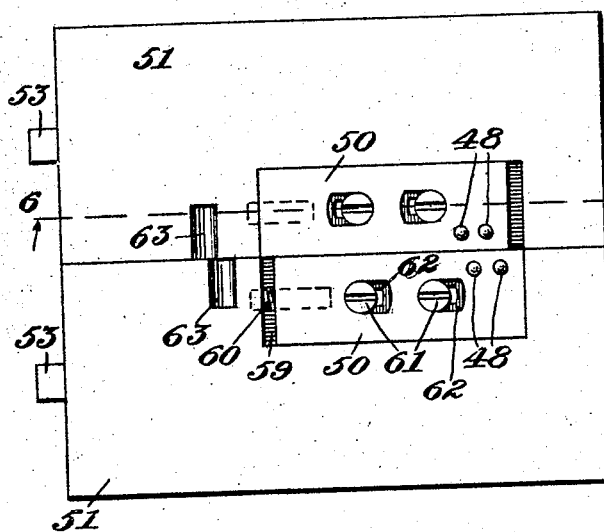
Fig. 5.
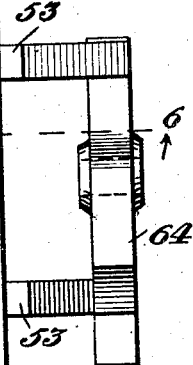
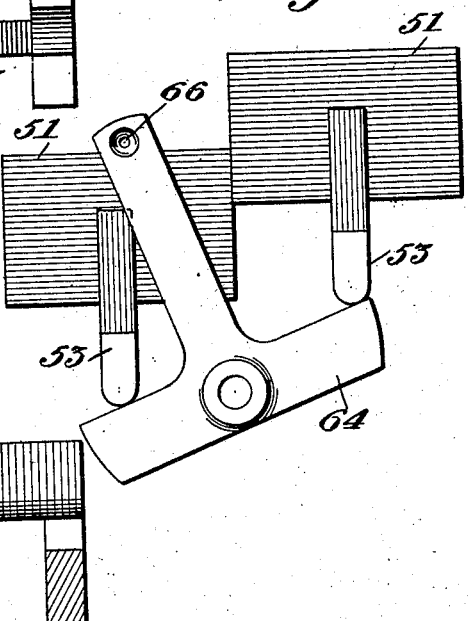
Fig. 7.
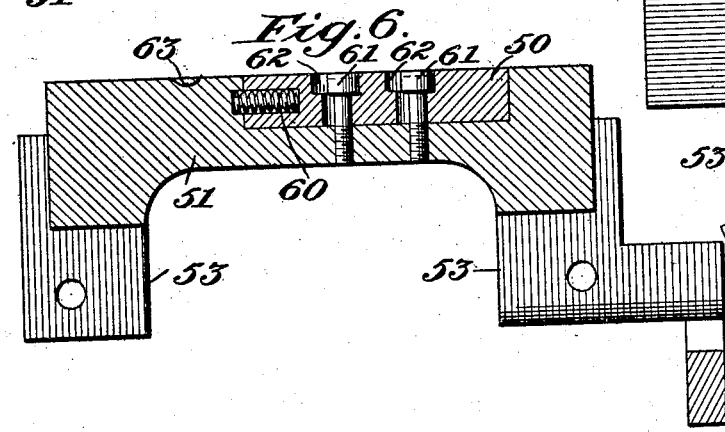
Fig. 6.
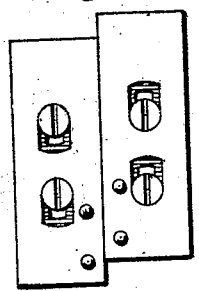
Fig. 8.
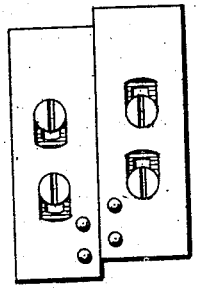
Fig. 9.
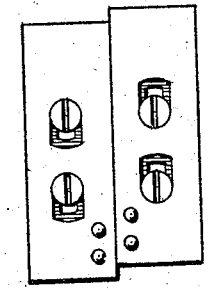
Fig. 10.
Fig. 8a.
Fig. 9a.
Fig. 10a.
Inventor:
Alvah A. Griner,
By
Chas. E. Riordan
Atty.

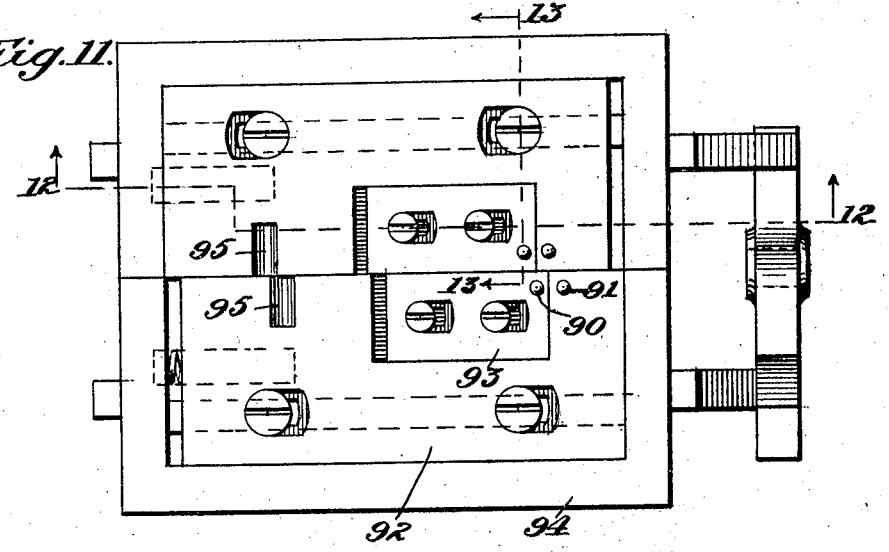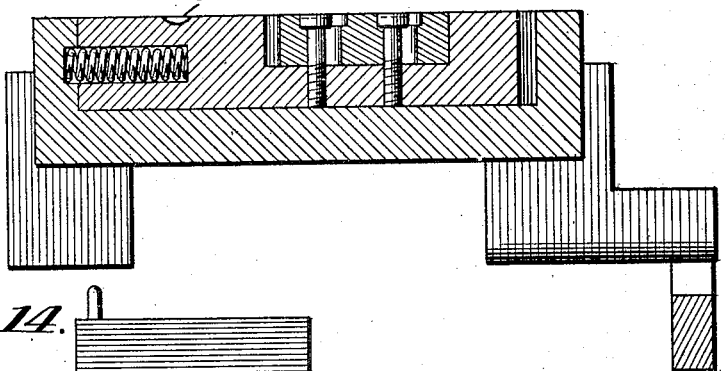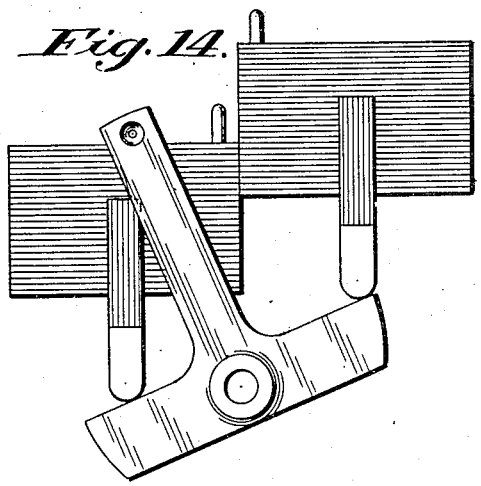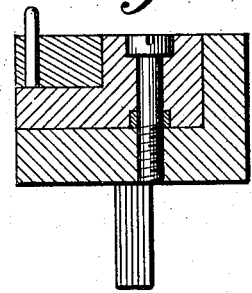

UNITED STATES PATENT OFFICE.

ALVAH A. GRINER, OF BAYSIDE, NEW YORK, ASSIGNOR TO RENAISSANCE CORSET CO., INC., OF NEW YORK, N. Y., A CORPORATION OF NEW YORK.

MACHINE FOR MAKING FABRICATED WIRE.

1,327,467.   Specification of Letters Patent.   Patented Jan. 6, 1920.

Application filed July 17, 1919. Serial No. 311,526.

*To all whom it may concern:*

Be it known that I, ALVAH A. GRINER, a citizen of the United States, and a resident of Bayside, in the county of Queens and State of New York, have invented certain new and useful Improvements in Machines for Making Fabricated Wire, of which the following is a specification.

This invention relates to machines for making fabricated wire and particularly garment stays consisting of oppositely disposed alternate loops extending transversely of the stay in a continuous formation from end to end of the stay.

One of the objects of the invention is to produce a machine of fewer parts than the machines heretofore known for the same purpose, thereby economizing in wear and reducing the cost of upkeep, as well as the cost of original production.

Another object of the invention is to produce a compact and durable machine by the use of which a complete finished fabricated product will be obtained free from undesirable twists which have heretofore necessitated the use of supplemental machines.

Other objects will appear as the description proceeds.

One embodiment of my invention is illustrated in the accompanying drawings in which—

Fig. 2 is a longitudinal section on the line 2—2 of Fig. 1.

Fig. 3 is a transverse section on the line 3—3 of Fig. 1.

Fig. 4 is a transverse section on the line 4—4 of Fig. 1.

Fig. 5 is a plan view of the pin-carriers and dies.

Fig. 6 is a longitudinal section on the line 6—6 of Fig. 5.

Fig. 7 is an end view of the dies and the wire carrier operated thereby.

Figs. 8, 9 and 10 are plan views of different arrangements of pin carriers.

Figure 1:
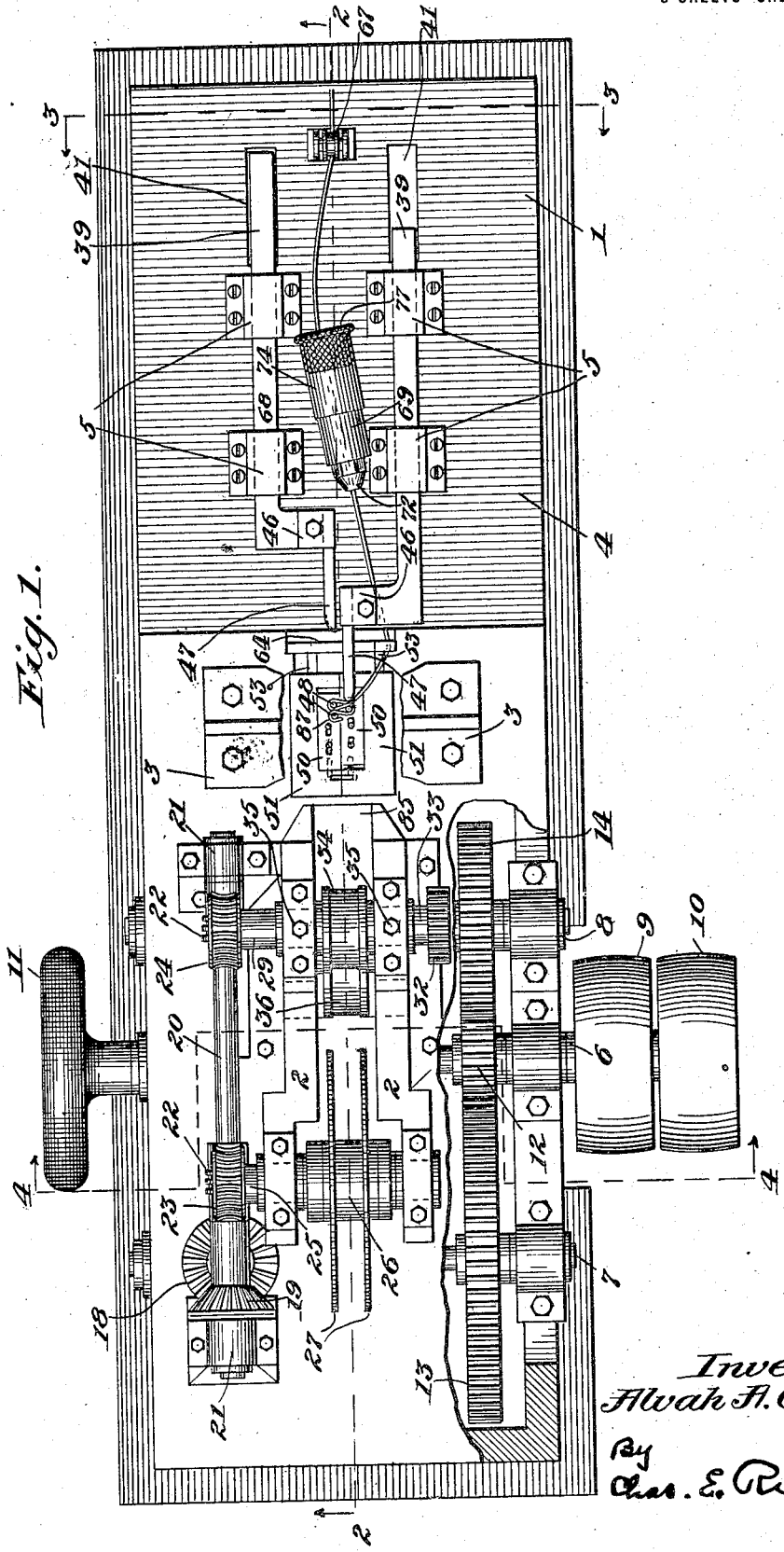
Figure 1 is a plan view of the machine, with parts broken away.

Figs. 8ª, 9ª and 10ª are views of the forms of stays produced by the arrangements shown in Figs. 8, 9 and 10, respectively.

Figs. 11, 12 and 14 are views similar to Figs. 5, 6 and 7, respectively, showing a further development of the pin-carrier.

Fig. 13 is a detail section on the line 13—13 of Fig. 11.

In carrying out the invention I employ a supporting frame or base 1, consisting of side and end walls and a top which will be firmly anchored to the floor of the workroom, and on the top of which are standards or cheeks 2, and a housing 3, the top of the base in advance of said housing 4, being stepped downward and having guide posts 5, erected thereon. The vertical walls of the base may be open as shown, to reduce dead weight, and in the openings in the side walls I mount bearings for the driving shaft 6, and the countershafts 7 and 8, the driving shaft being equipped with fast and loose pulleys 9 and 10, at one end for application of power, and at the opposite end with a hand wheel 11, for use in adjusting the machine or initially threading the wire therethrough. A pinion 12 on the driving shaft meshes with the gears 13 and 14 on the shafts 7 and 8, respectively, to transmit motion to the latter, and the shaft 7 is further equipped with a bevel gear 15 meshing with a similar gear 16 on the lower end of a vertical shaft 17 which extends through the top of the frame and is equipped with a bevel gear 18 on its upper end. The gear 18 meshes with a similar gear 19 on a shaft 20 which is journaled in suitable bearings 21 on the frame, said shaft 20 being disposed longitudinally of the frame at one side of the center thereof, as shown in Fig. 1. Worms 22 are provided at proper points on the shaft 20 to mesh with worm pinions 23 and 24 secured on transverse shafts mounted in the cheeks 2. The shaft 25, carrying the pinion 23, is equipped between the cheek plates 2 with a drum or reel 26, upon which the finished product is wound between the side plates 27, the product being indicated at 28. The pinion 24 is on one end of the shaft 29, which is equipped with a spur pinion 30, at its opposite end and carries a straightening and tension roll 31 between the cheek plates. The pinion 30 meshes with a pinion 32 on the end of a transverse shaft 33 which carries a straightening and tension roll 34 between the cheeks 2, the bearings for the shaft 33 being fitted in vertical slots in the cheeks and carried by screws 35 so that the roll 34 may be set to exert any desired pressure or tension upon the roller 31 and the fabric passing thereover. A third straightening and tension roller 36 is disposed below and in rear of the roller 31 and the shaft 37 of said roller 36 has its bearings mounted in arcuate slots 38 in the cheeks 2 concentric with the roller 31, any convenient or preferred means being employed to secure the bearings in an adjusted position.

The shaft 8 is a cam shaft for imparting movement to the benders and pin-carriers. The benders consist of bars 39 mounted for reciprocation in bearings on the posts 5, and having their front ends turned down, as at 40, to play in longitudinal slots 41 in the top wall of the base, the lower extremities of the vertical branches 40 being pivoted to the front ends of pitmen or eccentric rods 42 which are provided at intermediate points of their length with turn buckles 43 or other adjusting devices. The rear ends of the pitmen are secured to straps 44 of eccentrics 45 which are secured upon the shaft 8, it being understood that the eccentrics are oppositely disposed so that the bender bars 39 will reciprocate in opposite directions and consequently act upon the wire alternately. At their rear ends the bars 39 are constructed with clamps 46 projecting inwardly toward the central longitudinal line of the machine and in these clamps are secured the bender fingers 47, which are adapted to press the wire against and bend it around forming pins 48, the working ends of the fingers being constructed with grooves 49 to effectually engage the wire. To aid in preventing rotation of the fingers in their clamps or holders, they are preferably of a dove-tailed form as shown in Fig. 3.

The forming pins 48 rise from pin-carriers 50 which are seated in vertically movable dies 51 and are capable of a limited reciprocation longitudinally of the dies. The dies are fitted in a suitable opening in the frame and are supported by forked standards 52 which have their upper spaced extremities secured to lugs 53 at the ends of the dies, the lower ends of the standard being pivoted to levers 54 which are fulcrumed on hangers or brackets 55, depending from the top wall of the base 1, and are provided at their free ends with lateral pins 56 carrying rollers which run in the grooves 57 of the cams 58, secured on the shaft 8. The dies 51 are arranged with their adjacent opposed sides close together and the cams 58 are so arranged that the dies operate alternately. The pin carriers are disposed within recesses 59 in the dies and compression springs 60 are fitted to and held by sockets in the ends of the recesses and of the pin-carriers to hold the latter normally forward in the recesses 59. Headed pins or threaded studs 61 are inserted through longitudinal slots 62 in the pin carriers into the dies 51 to retain the pin-carriers in place and guide them in their movements. In the upper face of each die 51 in rear of the recess 59 is a groove or notch 63, the function of which will presently appear. The lugs 53 at the front ends of the dies are extended forward so as to project over the horizontal arms of an inverted T-shaped oscillatory wire guide and holder 64 which is pivoted by a pin 65 at the junction of its several arms within a channel provided therefor in the base. The upstanding arm or inverted stem of the member 64 is provided with an eye 66 through which the wire passes to be engaged by the benders. The wire entering the machine is passed under a guide pulley or roller 67 at the front end of the machine and then passes to and through the tension and oiling device 68 which is mounted on the frame between the benders, being disposed in an inclined position, so that the wire may pass properly to the eye 66 and being pivoted so that it may follow the movements of the guide and holder 64. The oiling and tension device comprises a main body 69 having a reduced stem 70 journaled in the top of the base 1 and held therein by nuts 71, or other fastenings on its lower end. In its upper end the body 69 is provided with a passage for the wire and in its opposite sides, in alinement with said passage, has internally threaded sockets, the rear socket receiving a nose 72, from which the wire issues and the front socket receiving a chuck 73. A sleeve 74 is threaded onto the chuck 73 and is constructed with a conical or tapered socket 75 to engage the correspondingly shaped end of the chuck and compress the same so as to exert the requisite tension on the wire and straighten the same. The forward end of the sleeve 74 is formed into a gland 76 closed by a cap 77 to receive oil and any oil-retaining material so that oil may be applied to the wire to facilitate its passage through the machine and to counteract its tendency to become highly heated, during the several bending operations.

As shown in Figs. 1 and 2 the dies and pin carriers are disposed at the base of the housing 3. Within said housing is mounted the upper die or plunger 78, provided at its lower end and near its rear side with lugs 79 to coact with the grooves or notches 63 in the lower dies, the forward side of the upper die being reduced to accommodate the forming pins. The shank 80 of the upper die is of proper form to fit closely within the housing and be thereby prevented from turning. The weight of the upper die, of course, holds it down to the lower dies, but it may yield somewhat to the upward movement of the latter, the yielding movement being against the action of a spring 81 which presses downward on the upper end of the shank 80 and is arranged between the shank and the follower 82, which is held upon the upper end of the spring by a screw 83, mounted in the upper end of the housing 3. By adjusting the screw 83, the tension of the spring may be regulated in an obvious manner.

On the top of the base in rear of the dies and in advance of the lowest tension and straightening roll 36, is an upwardly inclined guide table 84, having a longitudinal channel in its upper surface, to receive the fabricated wire from the dies and guide it to the roller 36, the edges of the fabric being straightened and made parallel during its passage around and between the rollers which are provided with annular flanges at their ends, as shown in Fig. 4, for this purpose.

To hold the fabric down in the channel a weighted cover 85 is provided to bear upon the wire and this cover is preferably pivoted as at 86, so that it may be raised when initially threading the wire and fabric through the machine.

In the operation of the machine, power is applied to the driving shaft 6, and by it transmitted directly to the countershafts 7 and 8, the gearing actuated by the shaft 7 serving to rotate the rollers 34, 31 and 36, and the drum 27, so that the fabric will be drawn from the table 84 and wound on the drum, all kinks and irregularities in the fabric being smoothed out by the pressure exerted thereon by the rollers. The shaft 8, through the several cams and eccentrics thereon, operates the benders and dies so that they will form the oppositely disposed loops of the fabric, some of the loops being shown at 87, in Fig. 1, in which figure one bender finger is shown bearing the wire which has been drawn across the path of the finger by the oscillating wire guide and holder 64. When the bender finger impinged against the wire, it carried the wire beyond the nearer forming pin on the adjacent pin-carrier which at that time had been lowered through the action of the cam 58 and lever 54, while the other die and pin-carrier were raised. The action of the bender finger caused the wire to be drawn taut about the advance pin on the raised die so that the loop was completely closed. As the rotation of the cam shaft continues, the bender finger will be withdrawn and the previously inactive finger will be projected, the lowered die being simultaneously raised and the raised die being lowered. As the lowered die rises, the advance forming pin thereon will assume a position in front of the strand of wire and the second pin will pass into the last formed loop on that side of the fabric. As the formerly raised die and pin-carrier descend, the pins thereon will be withdrawn from the loops of the fabric whereupon the spring bearing on said pin-carrier will thrust it forward in the recess 59. The descending die will exert pressure through its lugs 53 upon the inverted T-shaped wire guide and holder 64 so that said member will be rocked and will carry the wire across the path of the benders to the opposite side of the dies, and the movement of the parts is so timed that the rocker shifts from side to side immediately behind the withdrawing bending finger and clears the incoming finger. The shifting of the rocker draws the wire across the front of the pin which has just been elevated and the ensuing pressure from the bender finger completes the loop and pushes the wire back so that the raised pin-carrier will be carried rearward against the force of the spring 60, feeding of the fabric through the machine being thereby effected. Of course, as the wire is carried back and forth and the loops formed, a fresh length of wire is drawn through the tension device 68, and the operation may be repeated indefinitely or until the available supply of wire has been exhausted. As the length of the fabricated wire increases, the product will be fed over the dies by the described action of the pin-carriers and the benders so that the formed loops will be brought successively and step by step over the notches or grooves 63 and when either die rises the notch or groove therein will be carried into engagement with the corresponding lug 79 on the upper die or plunger and the loop disposed over said groove or notch will be thereby compressed or flattened.

In Figs. 8, 9 and 10, I have shown various adjustments of the forming pins, the arrangement shown in Fig. 8 producing loops having straight or parallel sides as shown by Fig. 8ª, while the arrangement illustrated in Fig. 9 will produce loops having converging sides as shown in Fig. 9ª, and the arrangement shown in Fig. 10 will produce overlapping loops as illustrated in Fig. 10ª.

In Figs. 11 to 14, I have shown an arrangement in which the pins 90 and 91 working at one side of the fabric rise from different carriers, the advance pin being on a large carrier 92, in which a smaller carrier 93, is seated, the rear pin being on the smaller carrier. The die 94 is utilized merely as a support for the carriers and as a trip to rock the oscillatory wire guide and holder, the grooves or notches 95 for straightening the loops being formed in the upper face of the carrier 92.

Having thus fully described my invention, what I claim as new and desire to secure by Letters Patent of the United States, is—

1. In a machine for the purpose set forth, the combination of forming pins, means for raising and lowering said pins, and guiding means through which the wire passes to the pins, said guiding means being actuated by parts of the means for raising and lowering the pins.

2. In a machine for the purpose set forth, the combination of series of forming pins, carriers for said pins, a pivotally mounted wire guide mounted adjacent and in advance of said carriers, and means on said carriers to engage said guide and rock the same.

3. In a machine for the purpose set forth, the combination of vertically movable dies, forming pins carried by said dies, a wire guide mounted in advance of and adjacent the dies, and lugs on the dies arranged to impinge against the guide and rock the same whereby to carry the wire across the pins alternately in opposite directions.

4. In a machine for the purpose set forth, the combination of vertically movable members operating alternately, forming pins carried by said members, an inverted T-shaped wire guide pivotally mounted in advance of and adjacent the vertically movable members and having a wire receiving eye at the upper end of its shank, and lugs on the vertically movable members arranged to impinge upon the lateral arms of the guide and rock the same.

5. In a machine for the purpose set forth, the combination of series of forming pins, a guide through which the wire passes arranged adjacent to and in advance of said pins to carry wire across the same alternately in opposite directions, means for actuating said guide, and alternately operating reciprocatory benders arranged to bend the wire closely around the pin across which it has been drawn.

6. In a machine for the purpose set forth, the combination of forming pins, reciprocating benders operating alternately to bend wire around the pins, a wire guide through which the wire passes mounted adjacent to said pins between the benders to dispose wire across the path of the active bender, and means for actuating said guide.

7. In a machine for the purpose set forth, the combination of a pair of forming pins, reciprocatory benders arranged to bend wire around the pins alternately, a wire guide through which the wire passes arranged between the benders and movable laterally whereby to dispose wire between a pin and the active bender, and a tension device between the benders through which the wire passes to the wire guide, said device being pivotally mounted whereby it may follow the movements of the guide.

8. In a machine for the purpose set forth, the combination of a pair of forming pins, reciprocatory benders arranged to bend wire around the pins alternately, a wire guide arranged between the benders and movable laterally whereby to dispose wire between a pin and the active bender, and an oiling device between the benders through which the wire passes to the wire guide, said device being pivotally mounted whereby it may follow the movements of the guide.

9. In a machine for the purpose set forth, the combination of a pair of forming pins, reciprocatory benders arranged to bend wire around the pins alternately, a wire guide arranged between the benders and movable laterally whereby to dispose wire between a pin and the active bender, and an oiling and tension device between the benders through which the wire passes to the wire guide, said device being pivotally mounted whereby it may follow the movements of the guide.

10. In a machine for the purpose set forth, the combination of forming pins, a laterally movable guide to dispose wire across the pins, reciprocatory benders operating alternately at the opposite sides of the guide to bend the wire around the pins, and a tension device between the benders, through which the wire passes to the guide, said device comprising a pivotally mounted body having a passage for wire in its upper portion, a chuck secured in one side of the body to fit around the wire, a sleeve engaging over the chuck and holding the same in frictional engagement with the wire, and a lubricant container on the sleeve through which the wire passes.

11. In a machine for the purpose set forth, the combination of a base, pin-carriers supported by and above the base, pins on the pin-carriers, reciprocatory benders mounted on the base, a drum on the base, presser rollers between the pin-carriers and the drum, and driving mechanism disposed within the base and operatively connected with the benders, the pin-carriers, the drum and the presser rollers.

12. In a machine for the purpose set forth, the combination of a base having longitudinal slots in its top, forming pins supported on the base, benders slidably mounted on the base to coöperate with the forming pins and having depending vertical branches at their front ends playing in and guided by said slots, and means within the base connected with said vertical branches to reciprocate the benders.

13. In a machine for the purpose set forth, the combination of reciprocatory alternately operating benders, forming pins arranged in alinement with the respective benders, pin-carriers for the pins mounted for limited longitudinal movement whereby pressure exerted by a bender upon a wire will cause rearward movement of the pins not in alinement with said benders, and yieldable means for holding the pin-carriers forward to the benders.

14. In a machine for the purpose set forth, the combination of reciprocatory alternately acting benders, alternately operating vertically movable dies arranged in alinement with the respective benders, pin-carriers seated in the dies and movable longitudinally in their seats, forming pins on the pin-carriers, to coöperate with the benders, and means for holding the pin-carriers forward in their seats, said means yielding to the pressure of the benders upon the wire whereby to effect feeding of the looped fabric over the dies.

15. In a machine for the purpose set forth, the combination of reciprocatory alternately acting benders, forming pins arranged in alinement with the respective benders, means for raising and lowering said pins whereby the pins will descend from the path of the active bender and rise as the bender withdraws, and means for holding the pins normally advanced toward the benders, said means yielding to the pressure from the benders whereby the looped fabric will be fed past the pins.

16. In a machine for the purpose set forth, the combination of vertically reciprocating alternately acting dies having seats in their upper sides, pin-carriers engaged in said seats and slidable longitudinally therein, forming pins rising from the pin carriers, alternately acting reciprocatory benders coöperating with the pins, and springs at the rear of the pin carriers holding them normally forward in their seats.

17. In a machine for the purpose set forth, the combination of lower vertically reciprocating dies, means at the forward portions of said dies to fabricate wire and feed the fabricated wire over the dies, and a yieldingly mounted upper die coöperating with the lower dies to straighten the loops of the fabricated wire.

18. In a machine for the purpose set forth, the combination of lower vertically reciprocating dies, means at the forward portions of said dies to fabricate wire and feed the fabricated wire over the dies, the dies being provided in their upper faces with transverse grooves in rear of said means, and an upper die having depending lugs on its lower end to engage the grooves in the lower dies and straighten the loops of the fabricated wire.

19. In a machine for the purpose set forth, the combination of vertically movable dies, means at the forward portions of said dies to fabricate wire and feed the fabricated wire over the dies, an upper die coöperating with the rear portions of the first mentioned dies to straighten the fabric and means for applying a yielding tension to the upper die.

20. In a machine for the purpose set forth, the combination of vertically movable dies, means at the forward portions of said dies to fabricate wire and feed the fabricated wire over the dies, an upper die coöperating with the rear portions of the first-mentioned dies to straighten the fabric, a spring bearing on the upper end of the upper die, a cap resting on the upper end of the spring, and an adjusting screw bearing on said cap.

21. In a machine for the purpose set forth, the combination of vertically movable dies, means at the forward portions of said dies to fabricate wire and feed the fabricated wire over the dies, an upper die coöperating with the rear portions of the first-mentioned dies to straighten the fabric, a housing for the upper die guiding the same and holding it against turning, and means within the housing for applying a yielding tension to the upper die.

22. In a machine for the purpose set forth, the combination of vertically movable dies, means at the forward portions of said dies to fabricate wire and feed the fabricated wire over the dies, means coöperating with the rear portions of the dies to straighten the fabric, a channeled table in rear of the dies to receive the fabric, means for drawing the fabric through the channel of said table, and means for maintaining the fabric in the channel during its passage therethrough.

23. In a machine for the purpose set forth, the combination of vertically movable dies, means at the forward portions of said dies to fabricate wire and feed the fabricated wire over the dies, means coöperating with the rear portions of the dies to straighten the fabric, a channeled table in rear of the dies to receive the fabric, means for drawing the fabric through the channel of said table, and a weighted cover bearing upon the fabric during its passage through the channel.

24. In a machine for the purpose set forth, the combination of vertically movable dies, means at the forward portions of said dies to fabricate wire and feed the fabricated wire over the dies, means coöperating with the rear portions of the dies to straighten the fabric, means in rear of the dies to guide the fabric, a train of rollers receiving the fabric from the last-mentioned means to straighten the edges of the fabric the lowermost roller of the train having its bearings mounted in arcuate slots concentric with the coacting roller of the train, and adjustable bearings for an upper roller of the train whereby to vary the tension of the same.

ALVAH A. GRINER.